United States Patent
Bitar et al.

(10) Patent No.: US 10,420,058 B2
(45) Date of Patent: Sep. 17, 2019

(54) DATA-DRIVEN SENSOR CONFIGURATION AND INFORMATION PROCESSING

(71) Applicant: Verizon Patent and Licensing Inc., Arlington, VA (US)

(72) Inventors: Nabil N. Bitar, Acton, MA (US); Guang Zeng, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 745 days.

(21) Appl. No.: 14/933,688

(22) Filed: Nov. 5, 2015

(65) Prior Publication Data

US 2017/0134216 A1    May 11, 2017

(51) Int. Cl.
*H04W 64/00* (2009.01)
*H04L 12/24* (2006.01)
*H04Q 9/00* (2006.01)

(52) U.S. Cl.
CPC ......... *H04W 64/003* (2013.01); *H04L 41/085* (2013.01); *H04Q 9/00* (2013.01); *H04Q 2209/80* (2013.01); *Y02D 70/00* (2018.01)

(58) Field of Classification Search
CPC ............................ H04W 64/003; H04L 41/085
USPC ........................................................ 709/220
See application file for complete search history.

(56) References Cited

U.S. PATENT DOCUMENTS

| | | | | |
|---|---|---|---|---|
| 5,987,604 | A * | 11/1999 | Edrich | G06F 12/10 713/1 |
| 2002/0114276 | A1 * | 8/2002 | Basturk | H04L 45/00 370/230 |
| 2010/0177750 | A1 * | 7/2010 | Essinger | H04L 67/12 370/338 |
| 2015/0151960 | A1 * | 6/2015 | McCleland | B81B 7/02 73/865.8 |

OTHER PUBLICATIONS

Lacanette, Temperature Sensor ICs Simplify Designs, Jan. 31, 2001, www.maximintegrated.com (7 pages).*

* cited by examiner

*Primary Examiner* — Wing F Chan
*Assistant Examiner* — Leon Y Tseng

(57) ABSTRACT

A system may include one or more sensor devices and a wireless communication device. The wireless communication device may be configured to receive an indication of a sensor event from a sensor device via an interface port; perform a table lookup in a configuration table based on the interface port; identify sensor data location in the sensor device based on the table lookup; read data at the identified sensor data location; encapsulate the read data into a data unit; and transmit the data unit over a wireless connection to a sensor management system.

19 Claims, 15 Drawing Sheets

470 ↙

| BITS | 1 | 2 | 3 | 4 | 5-6 | 7-8 | 9-10 | 11-16 | 17-20 | 21-32 | 33-96 | 97-98 | 99-123 |
|---|---|---|---|---|---|---|---|---|---|---|---|---|---|
| INITIALIZATION TABLE HEADER 532 | INTERFACE TYPE 534 | | | | INTERFACE ADDRESS 536 | | | NUMBER OF INIT ROWS 538 | PORT NUMBER 540 | | | | |
| INITIALIZATION TABLE ROWS 550 | START OF NEW TABLE 552 | | | | REGISTER ADDRESS LENGTH 554 | | | REGISTER VALUE LENGTH 556 | REGISTER ADDRESS VALUE 558 | REGISTER VALUE 560 | | ACTION 562 | LATENCY 564 |
| | ⋮ | | | | | | | | | | | | |
| | ⋮ | | | | | | | | | | | | |

(bit ranges 530 span the top)

FIG. 5B

DATA-DRIVEN SENSOR CONFIGURATION AND INFORMATION PROCESSING

BACKGROUND INFORMATION

Various types of electronic devices are available which collect information and send the information to another device over a network. As an example, various sensors may be used to collect sensor data and to communicate the sensor data to a centralized device. Sensors from different manufacturers, or different models of a sensor, may collect, process, and/or store information in a different manner. Therefore, a communication device that interfaces a particular sensor with another device may need to be configured to operate with the particular sensor. For example, a designer may need to develop code, such as new device drivers, in order to interface the communication device with the particular sensor. If a different sensor is later used, such as a sensor from a different manufacturer, the designer may need to develop new code for the communication device. Developing new code for each new sensor device may be expensive and/or time consuming.

BRIEF DESCRIPTION OF THE DRAWINGS

FIG. 5B is a diagram illustrating exemplary components of the initialization table of FIG. 4;

DETAILED DESCRIPTION OF PREFERRED EMBODIMENTS

Figure 1:
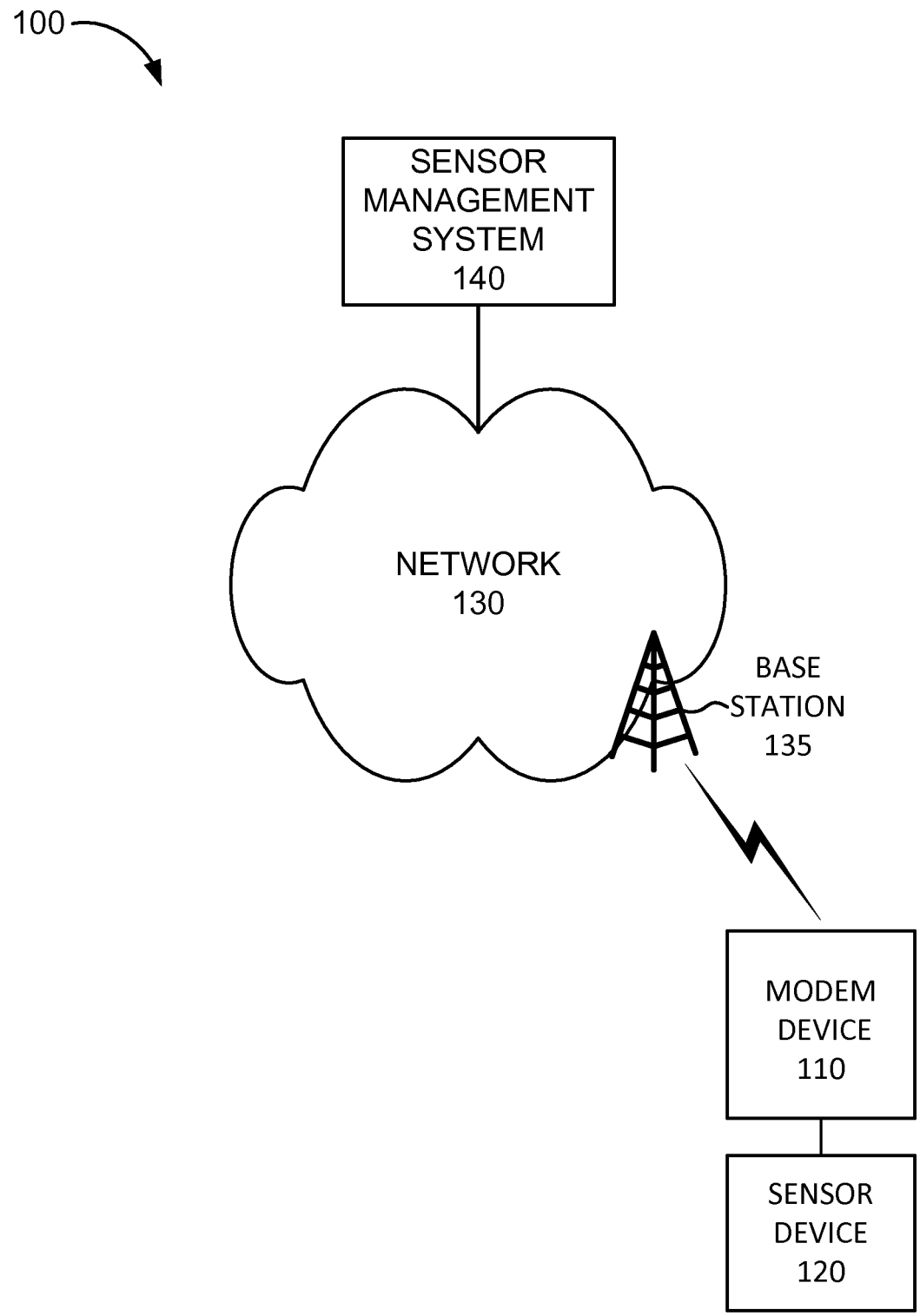
FIG. 1 is a diagram illustrating an exemplary environment according to an implementation described herein.

The following detailed description refers to the accompanying drawings. The same reference numbers in different drawings identify the same or similar elements.

Implementations described herein relate to data-driven sensor configurations and information processing. A modem device, such as a wireless communication device, may be configured to enable communication with a large number of different sensor devices and/or actuator devices. The processor of the modem device may be configured to read sensor data from a particular sensor/actuator device in opaquely, and/or to write data to a sensor/actuator device, without requiring local interpretation of the sensor data, without requiring code written specifically for the particular sensor/actuator device, without requiring an application programming interface for the particular sensor/actuator device, and/or without requiring a device driver for the particular sensor/actuator device. The modem device may include multiple interfaces that may be used to connect to the particular sensor device, such as a Serial Peripheral Interface (SPI) bus, a Universal Asynchronous Receiver/Transmitter (UART) bus, an Inter-Integrated Circuit (I2C) serial bus, and/or another type of peripheral interface. The multiple interfaces may enable interconnection with a large number of different sensor/actuator devices. In some implementations, the modem device may be connected to multiple sensors/actuators and a microcontroller unit may be configured to function as an interface between the modem device and the sensor/actuator devices. Furthermore, if the modem device and a sensor/actuator device cannot be collocated, a wireless access point device may be used to exchange short range wireless signals between the modem device and the sensor/actuator device. In other implementations, a microcontroller unit and a wireless access point device may be used together, with a modem device communicating with the microcontroller unit via a wireless access point device and the microcontroller unit communicating with one or more sensor/actuator devices.

Furthermore, the modem device may include one or more configuration tables and code written to process sensor/actuator data using the one or more configuration tables. The configuration tables may be populated with values for the particular sensor/actuator device. Thus, in order to collect sensor/actuator data from the particular sensor/actuator device, and/or to write data to a sensor/actuator device, a designer or a manufacturer may only need to fill in values in the configuration tables for the particular sensor device. The values may specify parameters associated with the particular sensor/actuator device, such as a register type, an interface type, an interface address, a register address, a register address length, a register value length, a particular action to perform, and/or other types of values. Thus, when a sensor event is detected, such as new sensor data being available, the modem device may determine how to read the data from the sensor based on the values stored in the configuration table.

The modem device may be configured to receive an indication of a sensor event from a sensor device via an interface port, by, for example, detecting an interrupt received at an interface port. The modem device may then index a configuration table based on the port number at which the interrupt was received in order to perform a table lookup in the configuration table, may identify a sensor data location in the sensor device based on the table lookup, and may read data at the identified sensor data location. The modem device may then perform an action on the read data, such as processing the read data locally or uploading the read data to a remote network resource (e.g., a device in the cloud). As an example, the modem device may encapsulate the read data into a data unit (e.g., packet, datagram, etc.) and transmit the data unit over a wireless connection to a sensor management system. As another example, the modem device may write data to a particular register of a sensor/actuator device.

A row of the configuration table may specify a type of register associated with the detected sensor event and the reading actions performed may be based on the type of specified register. For example, if the detected sensor event indicates that the sensor data is associated with an application register or a memory register, the modem device may determine an interface type, an interface address, and a memory register address associated with the application or memory register stored in a row of the configuration table associated with the port number, and may retrieve a register value stored in the application or memory register by accessing the application or memory register in the sensor device using the determined interface type, interface address, and application register address.

A sensor/actuator device may include a status register that stores information relating to the status of the sensor device. For example, the status register may include bits that represent other registers in the sensor/actuator device. When new data is available in a particular register, the bit associated with the particular register may be set (e.g., the value changed from 0 to 1 or vice-versa). Thus, a series of set bits may indicate locations in the sensor/actuator device that include new data. The modem device may determine that the detected sensor event is associated with a status register based on the port number and/or register type, may determine an interface type, an interface address, and a status register address associated with the status register stored in a row of the configuration table associated with the port number for the status register, and may retrieve a status value stored in the status register by accessing the status register in the sensor/actuator device using the determined interface type, interface address, and status register address.

Then, for each set bit in the retrieved status value, the modem device may identify a row of the configuration table, or may identify another configuration table, associated with the set bit. The modem device may determine an interface type, an interface address, a memory register address stored in the identified row for the set bit, and may retrieve a register value stored in a register associated with the determined register address, using the determined interface type, interface address, and register address. If one of the set bits corresponds in turn to another status register, the process may be repeated for that status register. Thus, data retrieval may be configured as a series of hierarchical reading operations.

Furthermore, the modem device may be configured to perform write operations to configure, control, and/or provide data to the sensor/actuator device. The modem device may be configured to receive a data unit from a remote device, such as a sensor management system in the cloud, and may retrieve a register value, a register address, interface type, and interface value from the received data unit. The modem device may then output the retrieved register value to the retrieved register address in the sensor device using the retrieved interface type and interface value.

Furthermore, the modem device may be configured to initialize the sensor/actuator device (e.g., to set a threshold value, a sensitivity value, a sampling time interval, actuator setting, etc.). The modem device may initialize the sensor/actuator device based on values stored in an initialization table. The initialization table may be populated during manufacture or at a later time by downloading values into the initialization table from a remote device. The modem device may detect activation of the sensor/actuator device and may access the initialization table, in response to detecting the activation of the sensor/actuator device. The modem device may determine a number of initialization rows in the initialization table and, for each row, may determine an interface type, an interface address, a register address, and a register value stored in the row, and may output the determined register value to the determined register address in the sensor/actuator device using the determined interface type and interface value.

FIG. 1 is a diagram illustrating an exemplary environment 100 according to an implementation described herein. As shown in FIG. 1, environment 100 may include a modem device 110, a sensor device 120, a network 130, and a sensor management system 140. While a single sensor device 120 is depicted as being connected to modem device 110 for illustrative purposes, in practice, modem device 110 may be connected to multiple sensor devices 120.

Modem device 110 may include a wireless communication device configured to communicate with sensor management system 140 via network 130 using wireless signals and configured to communicate with sensor device 120 using one or more different types of interfaces. Modem device 110 may be configured to communicate with sensor management system 140 using machine-to-machine (M2M) communication, such as machine-type communication (MTC), a type of M2M communication standardized by the $3^{rd}$ Generation Partnership Project (3GPP), or another type of M2M communication.

In some implementations, modem device 110 may include an embedded wireless communication device. For example, modem device 110 may be electronically connected to a microcontroller or application controller that communicates with sensor device 110 or may be directly connected to sensor device 110. In other implementations, modem device 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

Sensor device 120 may include one or more devices that collect information from the environment, a person, and/or one or more other devices (not shown in FIG. 1). Examples of sensor devices 120 may include an environment monitoring sensor (e.g., a temperature sensor, a humidity sensor, a pressure sensor, a wind speed sensor, a motion detector, a light detector, a camera, a microphone, etc.); a health monitoring sensor (e.g., a blood pressure monitoring device, a blood glucose monitoring device, etc.); a location sensor (e.g., a Global Positioning System receiver, etc.); a position or tilt sensor (e.g., an accelerometer, a gyroscope, etc.); a sensor monitoring one or more functions of a vehicle (e.g., a climate sensor, an engine sensor, etc.), a sensor monitoring an electronic sign (e.g., an electronic billboard, etc.), a sensor monitoring a manufacturing system (e.g., a robot arm sensor, an assembly line sensor, etc.), a security system sensor (e.g., a camera, a motion sensor, a window sensor, a lock sensor, a proximity sensor, etc.), a power system sensor (e.g., a smart grid monitoring device, etc.), a sensor monitoring a financial transaction system (e.g., a point-of-sale terminal, a vending machine, etc.), and/or another type of electronic sensor device.

Additionally or alternatively, sensor device 120 may include an actuator device. The actuator device may include an electrical and/or mechanical mechanism to convert electrical and/or magnetic energy into motion. For example, the actuator device may include a microelectromechanical (MEMS) actuator, an electric motor, a piezoelectric actuator, a pneumatic actuator, an electroactive polymer device, a thermal bimorph device, and/or another type of actuator device.

Network 130 may enable modem device 110 and sensor management system 140 to communicate with each other. Network 130 may include one or more wired and/or wireless networks. For example, network 130 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 130 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Network 130 may include base station 135. Base station 135 may send wireless signals to modem device 110 and may receive wireless signals from modem device 110.

Sensor management system 140 may include one or more devices, such as server devices, which manager the operation of sensor device 120. For example, sensor management system 140 may collect sensor data from sensor device 120. Furthermore, sensor management system 140 may initialize sensor device 120 using particular values for one or more parameters of sensor device 120 and/or may send instructions to sensor device 120 via modem device 110. Sensor management system 140 may be configured to provide a user interface to an operator that enables the operator to monitor data obtained by sensor device 120 and/or to configure sensor device 120.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
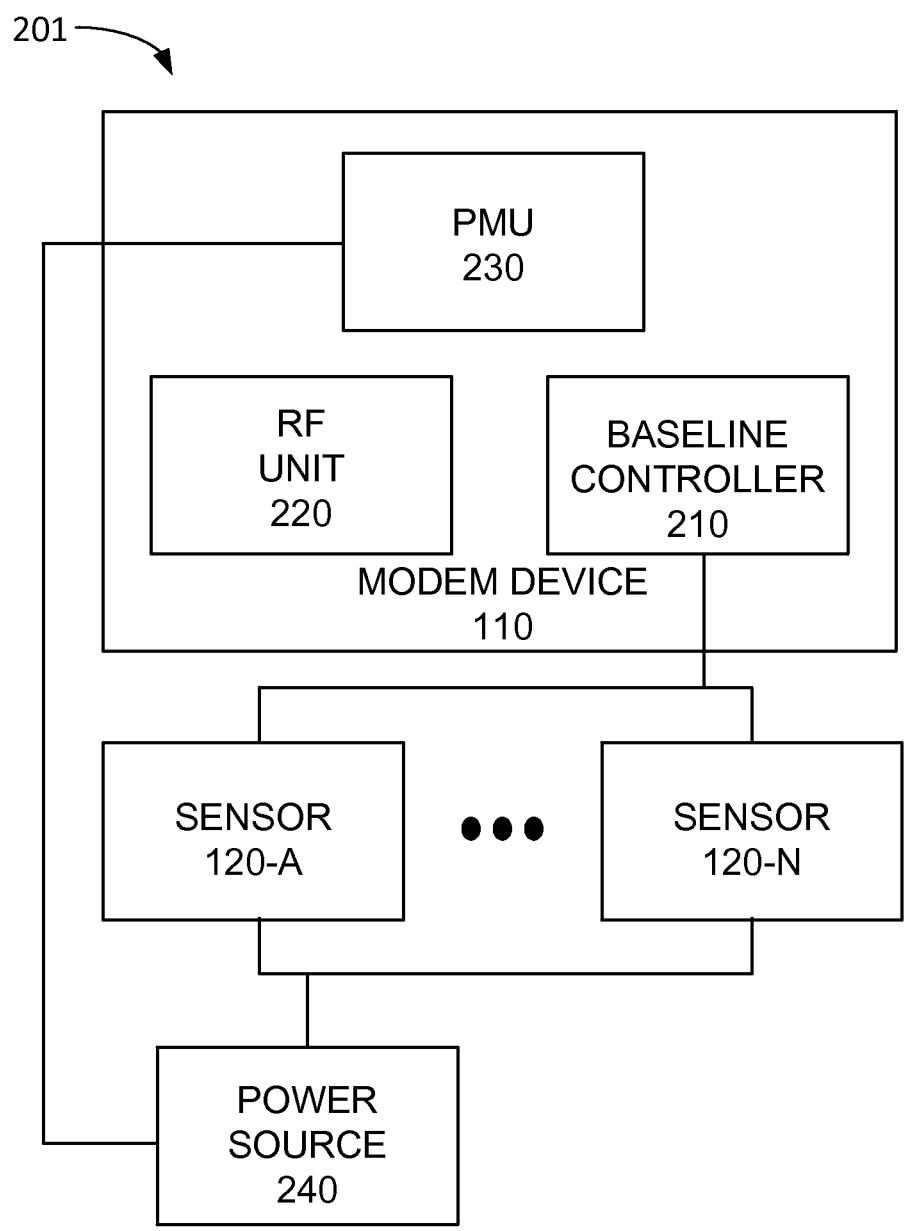
FIGS. 2A-2D are diagrams illustrating exemplary configurations of a modem device and one or more sensors according to an implementation described herein.

FIGS. 2A-2D are diagrams illustrating exemplary configurations of modem device 110 and one or more sensor devices 120 according to an implementation described herein. FIG. 2A illustrates a system 201 that includes a first exemplary configuration of modem device 110 and one or more sensor devices 120. In system 201, modem device 110 may be connected to sensor devices 110 directly one or more of multiple available interfaces, such as an SPI interface, a UART interface, an I2C interface, and/or another type of interface. As shown in FIG. 2A, system 201 may include modem device 110, sensor devices 120-A to 120-N, and power source 240. Modem device 110 may include a baseline controller 210, a radio frequency (RF) unit 220, and a power management unit (PMU) 230.

Baseline controller 210 may control the operation of modem device 110. Baseline controller 210 may include configuration tables for reading data from sensor devices 120-A to 120-N (e.g., a configuration table for each sensor device) and/or may include initialization tables for initializing sensor devices 120-A to 120-N (e.g., an initialization table for each sensor device). Baseline controller 210 may read data from sensor devices 120-A to 120-N, may package the data into data units, and may provide the data units to RF unit 220 for wireless transmission. RF unit 220 may include a wireless chipset (e.g., an LTE chipset) and an antenna assembly for communicating with base station 135.

Power source 240 may include a wired connection to a power source, such as a connection to a power outlet drawing power from a utility company or an alternate energy source, such as solar or wind power. Additionally or alternatively, power source 240 may include a battery back. Power source 240 may supply power to modem device 110 and to sensor devices 110-A to 110-N. PMU 230 may manage power source 240 to, for example, optimize power usage. As an example, in some implementations, PMU 230 may receive interrupts from sensor devices 120 when a sensor device 120 generates a new sensor event and may, in response, wake up modem device 110 from a sleep or idle mode.

The configuration of system 210 may eliminate the need for additional devices, such as a microcontroller device to control sensor devices 120-A to 120-N and may save power usage and device real estate on a circuit board or packaging scheme. Furthermore, baseline controller 210 may limit the need for custom code development across different applications for sensor devices 120 and may minimize the need for any eModem recertification.

Figure 2B:
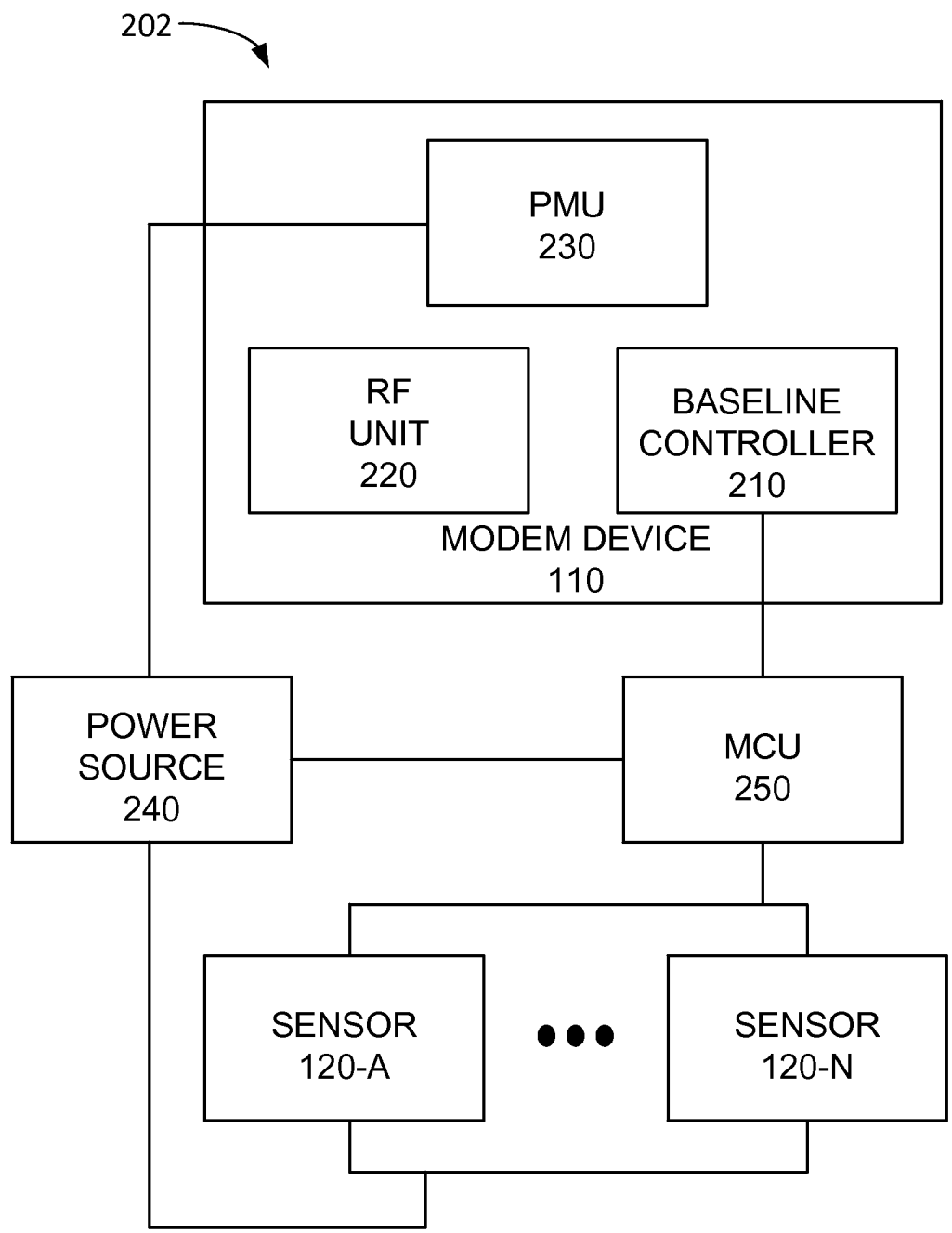

FIG. 2B illustrates a system 202 that includes a second exemplary configuration of modem device 110 and one or more sensor devices 120. As shown in FIG. 2B, system 202 may include modem device 110, sensor devices 120-A to 120-N, power source 240, and a microcontroller unit (MCU) 250. MCU 250 may be connected to modem device 110 and to sensor devices 120-A to 120-N and may function as an interface between modem device 110 and sensors 120-A to 120-N. Thus, modem device 110 may perceive MCU 250 as a single sensor device. MCU 250 may perform local application-level processing for sensor devices 120-A to 120-N, such as data aggregation, digital signal processing, sensor calibration or recalibration, etc.

Figure 2C:
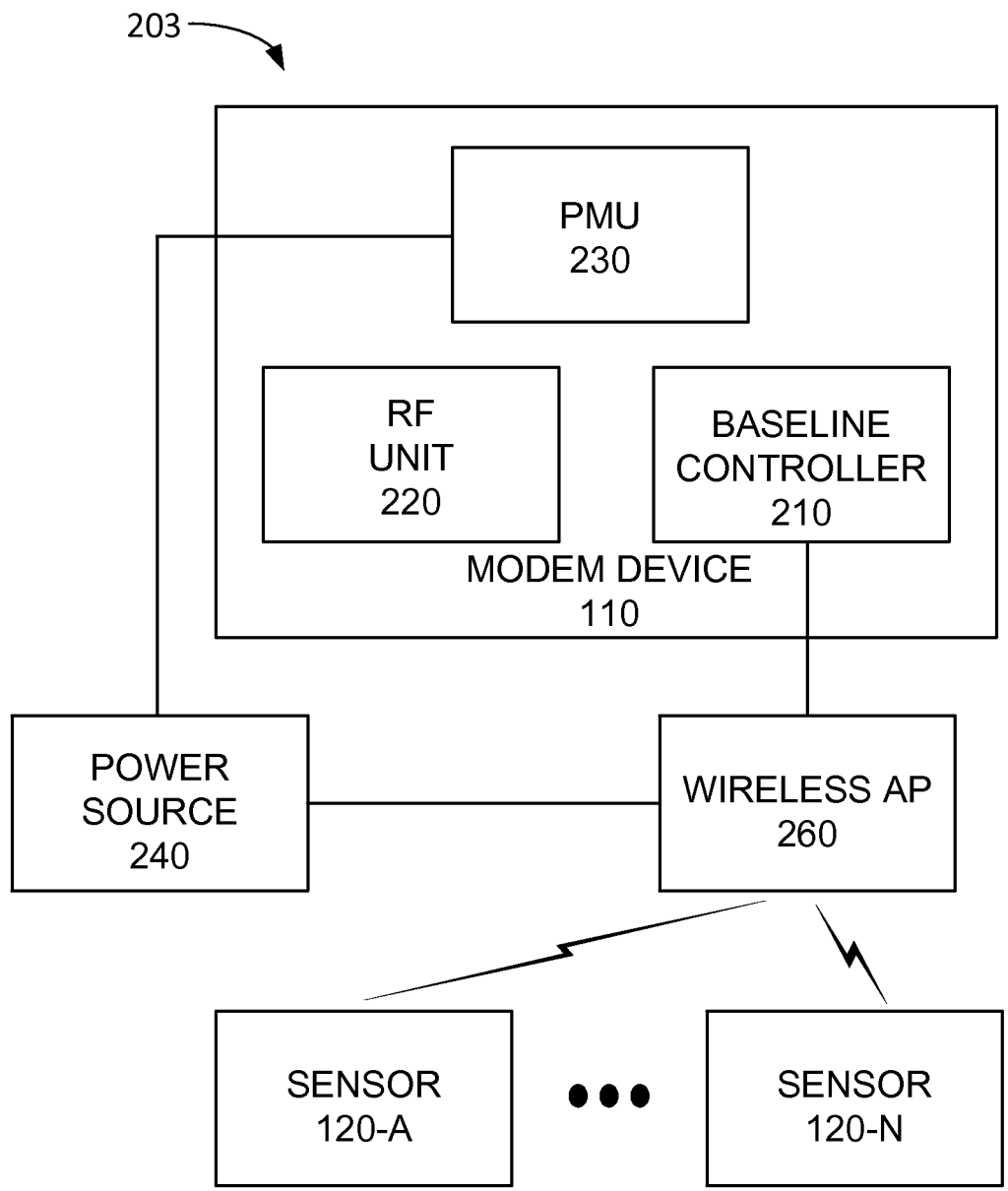

FIG. 2C illustrates a system 203 that includes a third exemplary configuration of modem device 110 and one or more sensor devices 120. As shown in FIG. 2C, system 203 may include modem device 110, sensor devices 120-A to 120-N, power source 240, and a wireless access point (AP) 260. System 203 may be used in applications where modem device 110 and sensor devices 120 cannot be collocated due to spatial or environmental conditions or for other reasons. Wireless AP 260 may be connected to modem device 110 via a particular interface and may communicate with sensor devices 120-A to 120-N using short range wireless signals. Wireless AP 260 may include a WiFi access point (e.g., based on an Institute of Electrical and Electronics Engineers' (IEEE) 802.11 standard), a wireless personal area network (WPAN) access point (e. g., based on an IEEE 802.15 standard using Bluetooth signals, Infrared Data Association (IrDA) signals, and/or other types of wireless signals), and/or another type of wireless AP device.

Figure 2D:
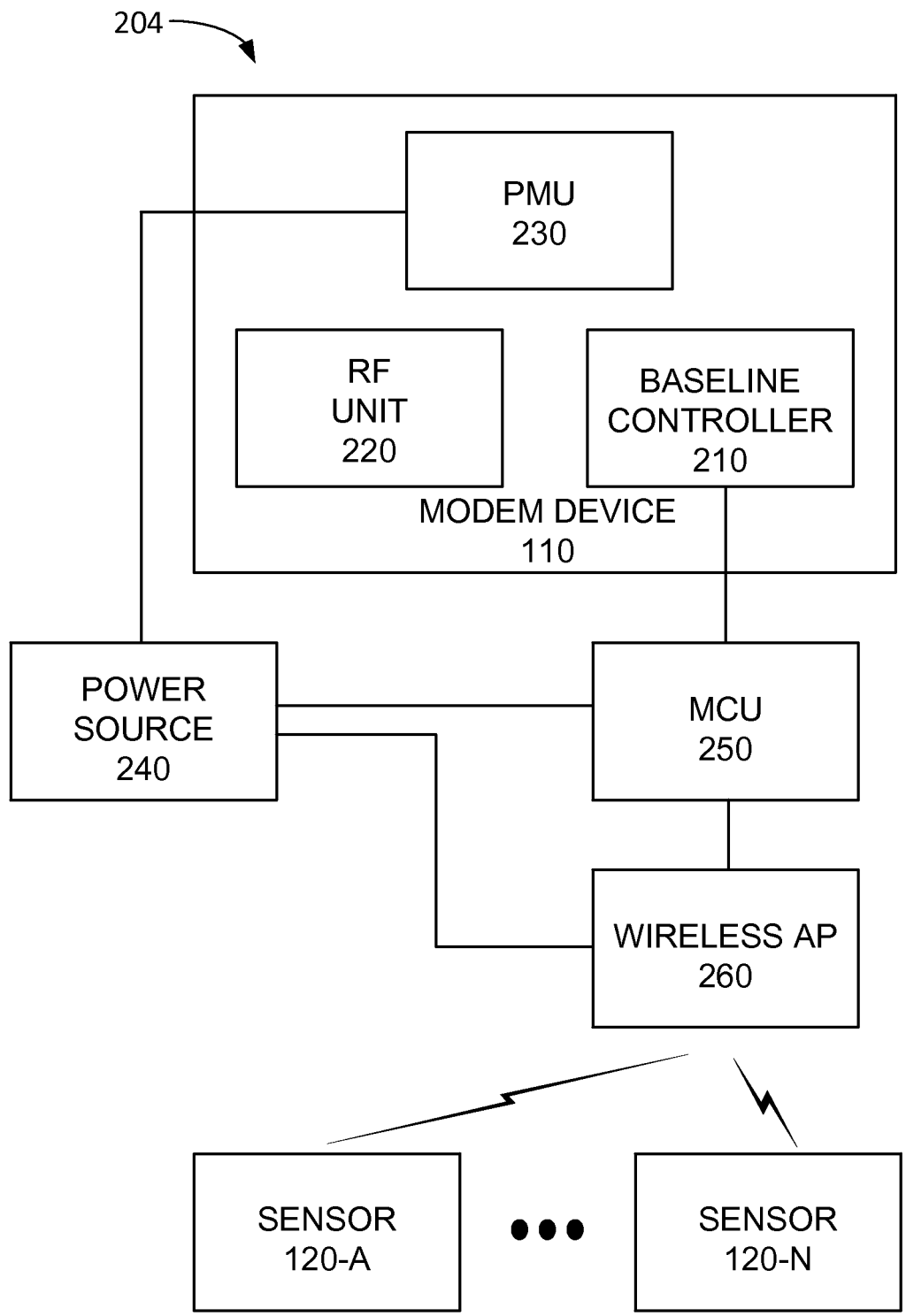

FIG. 2D illustrates a system 204 that includes a fourth exemplary configuration of modem device 110 and one or more sensor devices 110. As shown in FIG. 2D, system 20$ may include modem device 110, sensor devices 120-A to 120-N, power source 240, MCU 250, and wireless AP 260. Thus, in system 204, modem device 210 may be connected to MCU 250 and may perceive MCU 250 as a single sensor device 250. MCU 250 may be connected to wireless AP 260 and may communicate with sensor devices 120-A to 120-N using wireless AP 260.

Although FIGS. 2A-2D show exemplary components of systems 201-204, in other implementations, system 201, 202, 203, and/or 204 may include fewer components, different components, differently arranged components, or additional components than depicted in FIGS. 2A-2D. Additionally or alternatively, one or more components of, system 201, 202, 203, and/or 204 may perform functions described as being performed by one or more other components of systems 201, 202, 203, and/or 204.

Figure 3:
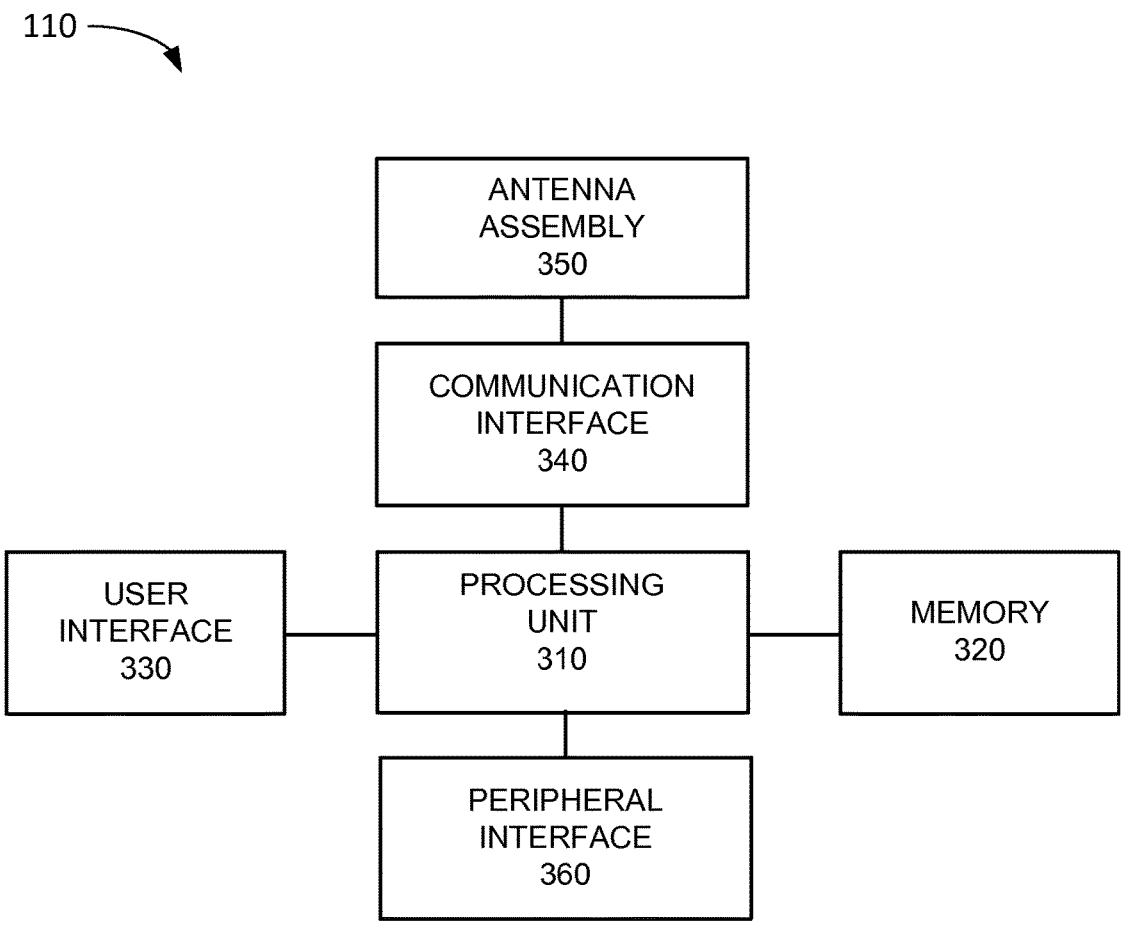
FIG. 3 is a diagram illustrating exemplary components of the modem device of FIG. 1 according to an implementation described herein.

FIG. 3 is a diagram illustrating example components of a modem device 110 according to an implementation described herein. As shown in FIG. 3, modem device 110 may include a processing unit 310, a memory 320, a user interface 330, a communication interface 340, an antenna assembly 350, and a peripheral interface 360. For example, baseline controller 210 of FIGS. 2A-2D may include processing unit 310, memory 320, user interface 330, and peripheral interface 360, and RF unit 220 of FIGS. 2A-2D may include communication interface 340 and antenna assembly 350.

Processing unit 310 may include one or more processors, microprocessors, application specific integrated circuits (ASICs), field programmable gate arrays (FPGAs), and/or other processing logic. Processing unit 310 may control operation of modem device 110 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to modem device 110 and/or to output information from modem device 110. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause modem device 110 to vibrate; and/or any other type of input or output device. In some implementations, modem device 110 may correspond to a "headless" embedded MTC device and may not include user interface 330.

Communication interface 340 may include a transceiver that enables modem device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

Peripheral interface 360 may be configured to communicate with one or more sensor devices 120. For example, peripheral interface 360 may include one or more logical components that include input and/or output ports, input and/or output systems, and/or other input and output components that facilitate the transmission of data to one or more sensor devices 120. As an example, peripheral interface 360 may communicate with peripheral devices using multiple available methods, such as an SPI bus and a corresponding protocol, such as a Wiegand protocol, an RS-485 protocol, and/or another type of protocol; a UART protocol and/or logic that translates data between parallel and serial forms; an I2C serial computer bus; and/or another type of parallel or serial computer bus interface.

As described herein, modem device 110 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 3 shows example components of modem device 110, in other implementations, modem device 110 may include fewer components, different components, differently arranged components, or additional components than depicted in FIG. 3. Additionally or alternatively, one or more components of modem device 110 may perform the tasks described as being performed by one or more other components of modem device 110.

Figure 4:
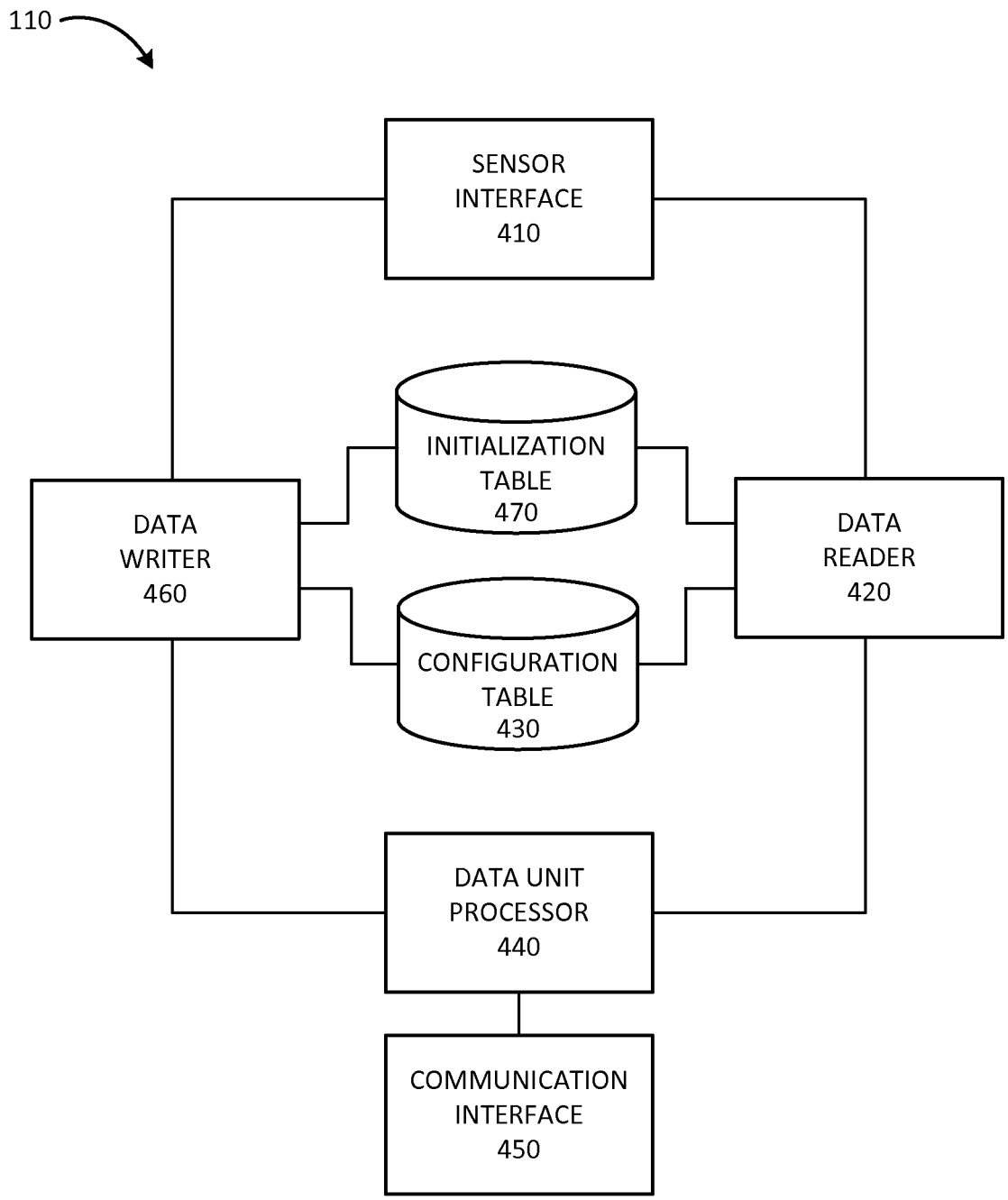
FIG. 4 is a diagram illustrating exemplary functional components of the modem device of FIG. 1 according to an implementation described herein.

FIG. 4 is a diagram illustrating exemplary functional components of modem device 110 according to an implementation described herein. The functional components of modem device 110 may be implemented, for example, via processing unit 310 executing instructions from memory 320. Alternatively, some or all of the functional components of modem device 110 may be implemented via hard-wired circuitry. As shown in FIG. 4, modem device 110 may include a sensor interface 410, a data reader 420, a configuration table 430, a data unit processor 440, a communication interface 450, a data writer 460, and an initialization table 470.

Sensor interface 410 may correspond to peripheral interface 360 described above with respect to FIG. 3 and/or may include logic configured to control the operation of peripheral interface 360.

Data reader 420 may perform reading operations to read data stored in sensor 120 based on information stored in configuration table 430. Exemplary information that may be stored in configuration table 430 is described below with reference to FIG. 5A. For example, data reader 420 may determine an interface type, interface address, and register address based on information stored in configuration table 430 and may read a register value stored at the register address in sensor 120 using the determined interface type and interface address.

Data unit processor 440 may incorporate data into one or more packets (and/or other types of data units) and may provide the one or more packets to communication interface 450 for transmission to sensor management system 140 via base station 135. The one or more packets may correspond to, for example, Transmission Control Protocol (TCP) packets. Furthermore, data unit processor 440 may receive one or more packets from communication interface 450, may retrieve data from the received one or more packets, and may write the data to a particular location in sensor device 120.

Communication interface 450 may include one or more logical components that may prepare data for wireless transmission by antenna assembly 350 or that may process data received by antenna assembly 350. For example, in some implementations, communication interface 340 may include a wireless chipset, such as a wireless chipset based on the LTE standard specified by 3GPP. In other implementations, communication interface 450 may include a different type of wireless chipset, such as an enhanced High Rate Packet Data (eHRPD) wireless chipset, a WiFi wireless chipset, a Bluetooth™ wireless chipset, a near field communication chipset, and/or another type of chipset.

Data writer 460 may perform data writing operations to write data to sensor 120 based on information received from communication interface 450 (e.g., information received from sensor management system 140 via a wireless connection to base station 135). For example, data unit processor 440 may retrieve an interface type, interface address, a register address, and a register value from a data unit received by communication interface 450 and data writer 460 may write the retrieved register value to a register in sensor 120 at the retrieved register address using the retrieved interface type and interface address. Furthermore, data writer 460 may initialize sensor device 120 using information stored in initialization table 470. Exemplary information that may be stored in initialization table 470 is described below with reference to FIGS. 5B and 5C.

Although FIG. 4 show exemplary components of modem device 110, in other implementations, modem device 110 may include fewer functional components, different functional components, differently arranged functional components, or additional functional components than depicted in FIG. 4. Additionally or alternatively, one or more functional components of modem device 110 may perform functions described as being performed by one or more other functional components of modem device 110.

Figure 5A:
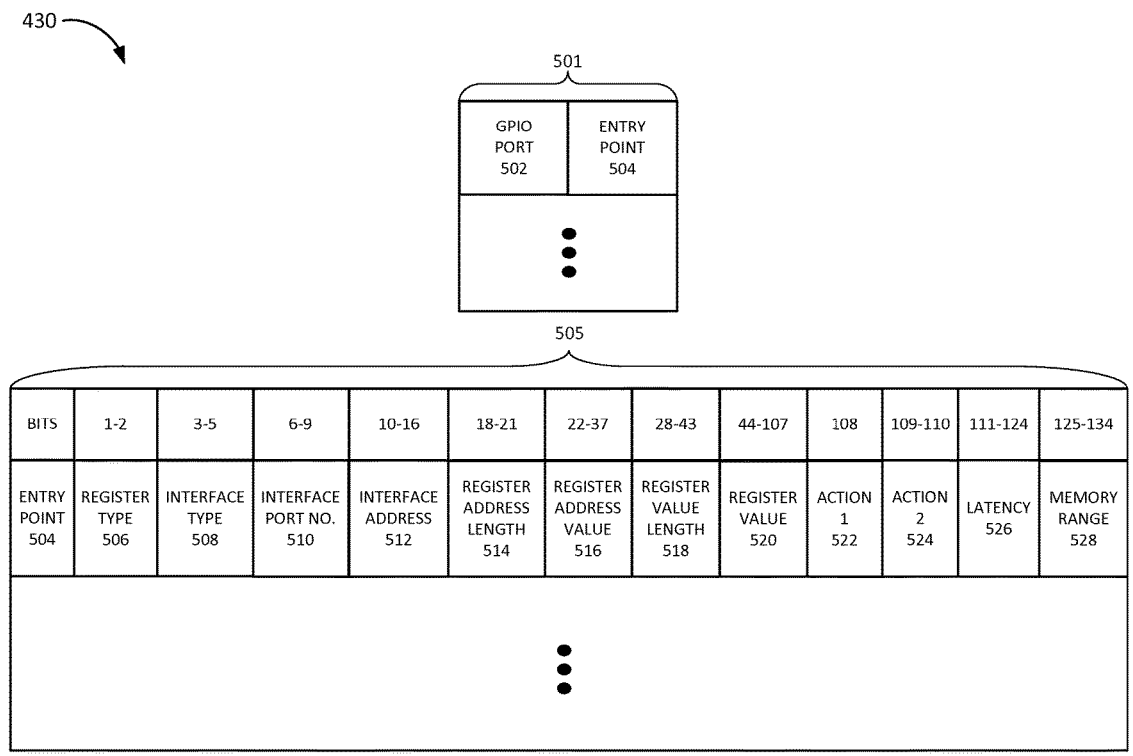
FIG. 5A is a diagram illustrating exemplary components of the configuration table of FIG. 4.

FIG. 5A is a diagram illustrating exemplary components of configuration table 430. As shown in FIG. 5A, configuration table 430 may include an interrupt table 501 and one or more configuration rows 505. Interrupt table 501 may map general purpose input/output (GPIO) port numbers to entry points of configuration table 430 corresponding to particular configuration rows 505. Each row of interrupt table 501 may include a GPIO port entry 502 and an entry point entry 504. GPIO port entry 502 may identify a particular GPIO port number on which an interrupt may be received. Entry point entry 504 may identify a particular point of entry in configuration table 505 associated with the particular GPIO port number. The entry point may be defined in terms of a bit offset. Thus, when an interrupt is received at the particular GPIO port, configuration table 505 may be accessed at a location defined by the bit offset specified by the entry point. For example, when an interrupt is received from sensor device 120 on a port number corresponding to the port number identified in GPIO port entry 502, modem device 110 may interpret the interrupt as indicating a sensor event associated with a particular register and may select a corresponding configuration row 505 associated with the particular register.

Configuration row 505 may store information relating to a particular register of sensor device 120. Configuration row 505 may include an entry point entry 504, a register type entry 506, an interface type entry 508, an interface port number entry 510, an interface address entry 512, a register address length entry 514, a register address value entry 516, a register value length entry 518, a register value entry 520, a first action entry 522, a second action entry 524, a latency entry 526, and a memory range entry 528.

Each entry may be associated with a particular number of bits as shown in FIG. 5A. While a particular number of bits is shown for each entry/column in configuration table 505, in other implementations, a different number of bits may be used for one or more of the entries/columns in configuration table 505.

Entry point entry 504 may identify an entry point for a particular row of configuration table 505. For example, entry point entry 504 may identify an offset, in terms of a number of bits from the beginning of configuration table 430, to the particular configuration row.

Register type entry 506 may store a value identifying a register type for the particular register associated with the particular configuration row 505. For example, a 00 value may indicate an application register, a 01 value may indicate a status register, and a 10 value may indicate an output buffer or memory register. Interface type entry 508 may include interface type information for the particular register and interface port number entry 510 may store information identifying a particular interface port number for associated with the particular register. For example, a 000 value may identify a NULL interface type, a 001 value may identify an I2C type interface, a 010 value may identify an SPI interface, and a 011 value may identify a UART interface. Interface address entry 512 may store an interface address value, for identified interface type, for the particular register.

Register address length entry 514 store a register address length value for the particular register and register address value entry 516 may store a register address value for the particular register. Register value length entry 518 may store a register value length value for the particular register and register value entry 520 may store a register value that has been read from, or that is to be written to, the particular register.

First action entry 522 may include information specifying a first type of action to be taken with respect to the particular register. For example, a 0 value may indicate that the value read for the particular register should be sent to the cloud (e.g., to sensor management system 140) and a 1 value may indicate that a local action is to be taken. In some implementations, multiple local actions may be specified by different values. A local action may include an instruction to do nothing, an instruction to check another condition to determine whether to send the read value to the cloud (e.g., send the read value to the cloud only if the battery power is above a particular threshold), an instruction to store the read value in a local memory device, an instruction to send the read data to another device connected to modem device 110 (e.g., another sensor device 120), and/or another type of local action. Second action entry 524 may include information specifying a second type of action. For example, a 00 value may specify a read action and a 01 value may specify a write action. Other values may specify other actions to be taken.

Latency entry 526 may store information identifying a latency associated with reading or writing to the particular register. For example, if a latency value is zero, the action may be performed immediately and if the latency value is non-zero, the latency value may specify the number of milliseconds (ms) to wait before performing the action. Furthermore, if an interrupt is received, interrupts may be disabled for a length of time corresponding to the latency for the particular register. After the latency time has elapsed, interrupts may be enabled again. Memory range entry 528 may store information identifying a memory range for the particular register (e.g., if the register corresponds to a memory register).

Although FIG. 5A show exemplary components stored in configuration table 430, in other implementations, configuration table 430 may include fewer components, different components, differently arranged components, or additional components than depicted in FIG. 5A.

FIG. 5B is a diagram illustrating exemplary components of initialization table 470. As shown in FIG. 5B, initialization table 470 may include one or more initialization tables 530. Each initialization table 530 may store initialization information for a sensor device 120 connected to modem device 110. Initialization table 530 may include an initialization header 532 and initialization table rows 550.

Initialization header 532 may store information relating to corresponding initialization table rows 550. Initialization header 532 may include a interface type entry 534, an interface address entry 536, a number of initialization rows entry 538, and a port number entry 540. Interface type entry 534 may store information identifying the interface type for initialization table 530. Interface address entry 536 may store information identifying the interface address for initialization table 530. Number of initialization rows entry 538 may include information specifying the number of initialization table rows 550 for initialization table 530. Port number entry 540 may store information identifying the port number for the interface address for initialization table 530.

Each one of initialization table rows 550 may store information corresponding to a value that is to be initialized in sensor device 120. A particular initialization table row 550 may include a start of new table entry 552, a register address length entry 554, a register value length entry 556, a register address value entry 558, a register value entry 560, an action entry 562, and a latency entry 564.

Start of new table entry 552 may indicate the start and end of the rows of initialization table 530. For example, a 000000 value may indicate a table entry that stores an initialization value, a 000001 value may indicate the beginning of initialization table rows 550, a 000010 value may indicate the end of initialization table rows 550, and a 100000 value may correspond to a flag that indicates that another initialization table 530 exists in subsequent rows.

Register address length entry 554 may store a register address length value for the particular register associated with a particular initialization table row 550. Register value length entry 556 may store a register value length value for the particular register associated with the particular initialization table row 550. Register address value entry 558 may store a register address value for the particular register associated with the particular initialization table row 550. Register value entry 560 may store an initialization value that is to be written to the particular register in sensor device 120 (e.g., a threshold value, a calibration value, a sampling interval value, etc.).

Action entry 562 may include information specifying a type of initialization action that is to be taken. For example, a 00 value may specify a read action and a 01 value may specify a write action. Other values may specify other actions to be taken. Latency entry 564 may store information identifying a latency associated with reading or writing to the particular register. For example, the latency value may specify an amount of time to wait before performing the actions and/or may specify an amount of time during which interrupts, and/or other types of processes of modem device 110 are to be paused while the particular initialization table row 550 is being processed.

Although FIG. 5B shows exemplary components stored in initialization table 470, in other implementations, initialization table 470 may include fewer components, different components, differently arranged components, or additional components than depicted in FIG. 5B.

Figure 6:
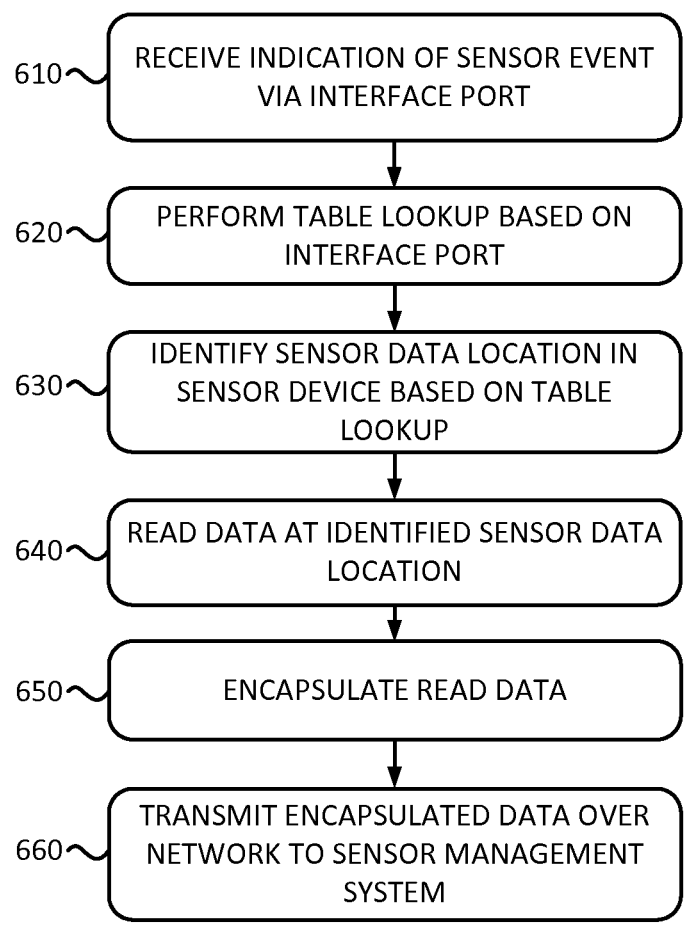
FIG. 6 is a flowchart of an exemplary process for processing sensor data according to an implementation described herein.

FIG. 6 is a flowchart of an exemplary process for processing sensor data according to an implementation described herein. In one implementation, the process of FIG. 6 may be performed by modem device 110. In other implementations, some or all of the process of FIG. 6 may be performed by another device or a group of devices separate from modem device 110 and/or including modem device 110.

The process of FIG. 6 may include receiving an indication of a sensor event via an interface port (block 610). For example, modem device 110 may receive an interrupt on a particular GPIO port number. A table lookup may be performed based on the interface port (block 620) and a sensor data location may be identified in a sensor device based on the table lookup (block 630). For example, modem device 110 may identify a location in sensor device 120 where new available data is stored and may read the data at the identified location. A process for identifying and reading data in sensor device 120 is described below in more detail with reference to FIG. 7.

The data may be read at the identifier sensor data location (block 640), the read data may be encapsulated (block 650), and the encapsulated data may be transmitted over a network to a sensor management system (block 660). For example, data unit processor 440 may incorporate the read data into one or more packets (and/or other types of data units) and may provide the one or more packets to communication interface 450 to transmit the one or more packets to sensor management system 140 via base station 135. The one or more packets may correspond to, for example, TCP packets.

Figure 7:
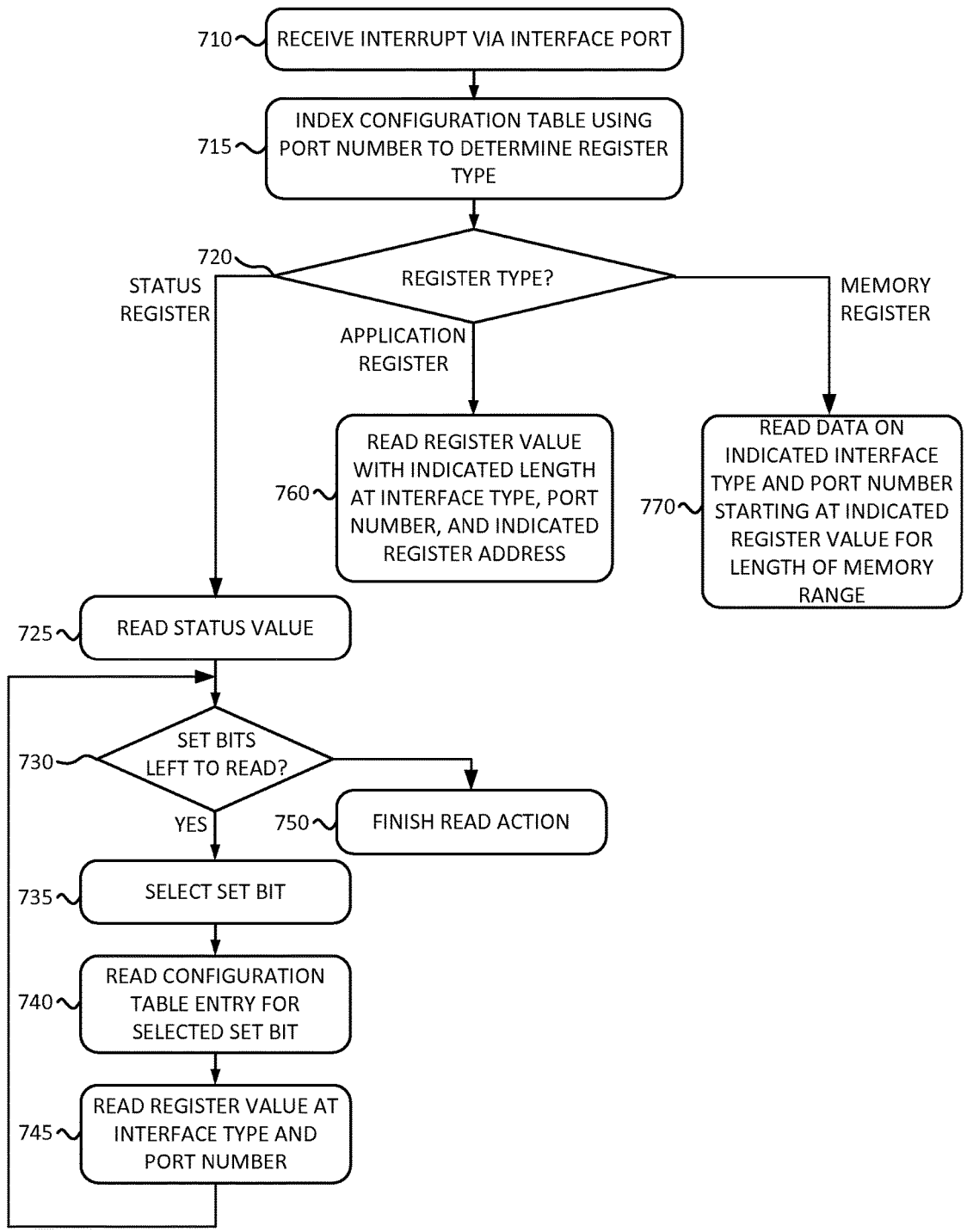
FIG. 7 is a flowchart of an exemplary process for reading sensor data according to an implementation described herein.

FIG. 7 is a flowchart of an exemplary process for reading sensor data according to an implementation described herein. In one implementation, the process of FIG. 7 may be performed by modem device 110. In other implementations, some or all of the process of FIG. 7 may be performed by another device or a group of devices separate from modem device 110 and/or including modem device 110.

The process of FIG. 7 may include receiving an interrupt via an interface port (block 710) and indexing a configuration table using the port number to determine a register type (block 720). For example, sensor interface 410 may receive an interrupt on a particular GPIO port and may provide an indication of the received interrupt to data reader 420. Data reader 420 may index configuration table 430 to identify a configuration row 505 associated with the GPIO port number. For example, if configuration table 430 is offset M bytes and the GPIO port number is X, configuration table 430 may be indexed based on M+X*6 bytes. A determination may be made as to what type of register is associated with the received interrupt (block 720). For example, data reader 420 may access register type entry 506 of configuration row 505 to determine whether the interrupt is associated with a status register, an application register, or a memory register.

If it is determined that the register type corresponds to a status register (block 720—STATUS REGISTER), a status value may be read (block 725). For example, data reader 420 may read a status value stored in the status register at the register address value stored in register address value entry 516 of configuration row 505 using the interface type and interface address specified in interface type entry 508 and interface address entry 512 via interface port number stored in interface port number entry 510.

A determination may be made as to whether there are set bits left to read in the read status value (block 730). If it is determined that there are set bits left to read (block 730—YES), data reader 420 may select a set bit (block 735) and may read a configuration table entry for the selected set bit (block 740). For example, if rows of configuration table 430 are 48 bits long, and if the selected set bit is bit P, data reader 420 may read configuration table 430 at the row location determined by M+97(=16*6+1)+X*48+P*6. A register value may be read at the specified register address using the specified interface type and interface address (block 745). For example, data reader 420 may read a register value stored in the register at the register address value in sensor device 120 specified in register address value entry 516 of configuration row 505 using the interface type and interface address specified in interface type entry 508 and interface address entry 512 and may store the read value in register value entry 520.

Processing may return to block 730 to determine as to whether there are set bits left to read in the read status value. If additional set bits remain (block 730—YES), blocks 735, 740, and 745 may be repeated for each remaining set bit. If not additional set bits remain (block 730—NO), the read action may be finished (block 750).

Returning to block 720, if it is determined that the register type corresponds to an application register (block 720 —APPLICATION REGISTER), data reader 420 may read an application register value, with length indicated in register value length entry 518, that is stored in the application register at the register address value in sensor device 120 specified in register address value entry 516 of configuration row 505 using the interface type and interface address specified in interface type entry 508 and interface address entry 512 via the interface port number stored in interface port number entry 510 (block 760).

Returning to block 720, if it is determined that the register type corresponds to a memory register (block 720 —MEMORY REGISTER), data reader 420 may read a memory register value, with length indicated in memory range entry 528, that is stored in the memory register at the register address value in sensor device 120 specified in register address value entry 516 of configuration row 505 using the interface type and interface address specified in interface type entry 508 and interface address entry 512 via the interface port number stored in interface port number entry 510 (block 770).

Figure 8:
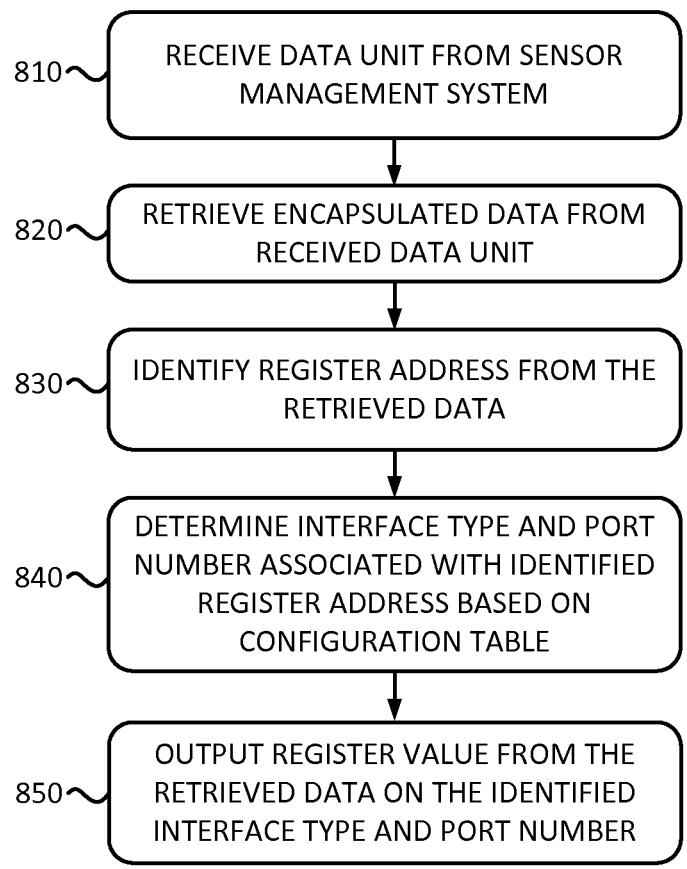
FIG. 8 is a flowchart of an exemplary process for writing sensor data according to an implementation described herein.

FIG. 8 is a flowchart of an exemplary process for writing sensor data according to an implementation described herein. In one implementation, the process of FIG. 8 may be performed by modem device 110. In other implementations, some or all of the process of FIG. 8 may be performed by another device or a group of devices separate from modem device 110 and/or including modem device 110.

The process of FIG. 8 may include receiving a data unit from a sensor management device (block 810) and retrieving encapsulated data from the received data unit (block 820). For example, data unit processor 440 may receive one or more packets from sensor management device via base station 135 and communication interface 450, and may retrieve data from the received one or more packets. The data may include a register value to be written to a register address in sensor device 120.

A register address may be identified from the retrieved data (block 830), an interface type and an interface address associated with the identified register address may be determined based on the configuration table (block 840), and the register value from the retrieved data may be outputted using the identified interface type and interface address (block 850). For example, data writer 460 may access configuration table 430 to identify configuration row 505 associated with the specified register address, may determine the interface type and interface address specified in the identified configuration row 505, and may output the retrieved register value to the register address in sensor device 120 using the determined interface type and interface address.

Figure 9:
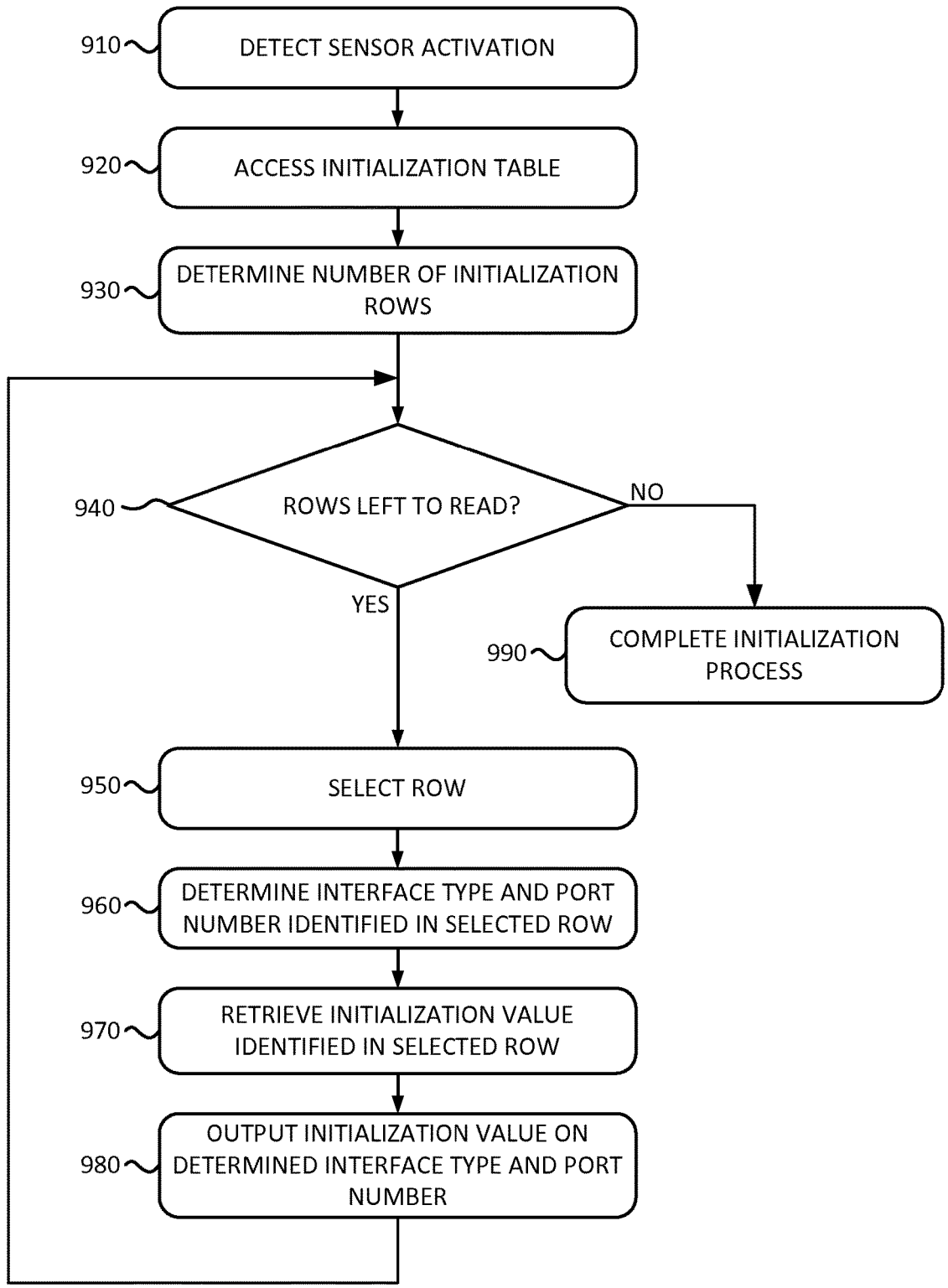
FIG. 9 is a flowchart of an exemplary process for initializing a sensor device according to an implementation described herein.

FIG. 9 is a flowchart of an exemplary process for initializing a sensor device according to an implementation described herein. In one implementation, the process of FIG. 9 may be performed by modem device 110. In other implementations, some or all of the process of FIG. 9 may be performed by another device or a group of devices separate from modem device 110 and/or including modem device 110.

The process of FIG. 9 may include detecting sensor activation (block 910), accessing initialization table 470 in response to detecting the sensor activation (block 920), and determining the number of initialization rows (block 930). For example, modem device 110 may detect a new sensor device 120 connected via a particular interface type, may detect that modem device 110 has been powered up or woken up from a sleep mode, may receive an instruction to activate or initialize sensor device 120 from sensor management system 140, and/or may detect activation of sensor device 120 based on another type of detected event. Data writer 460 may access initialization table 470 and may determine the number of initialization rows for the interface type associated with sensor device 120 based on number of initialization rows entry 538 in initialization table 530 associated with the interface type to which sensor device 120 is connected.

A determination may be made as to whether there are rows left to read (block 940). If it is determined that there are rows left to read (block 950—YES), a row may be selected (block 950). For example, data writer 460 may select the next initialization table row 550 in interface table 530 associated with the interface type associated with the activated sensor device 120. A register address may be identified in the selected row (block 960) an initialization value may be retrieved that is stored in the selected row (block 970), and the initialization value may be outputted on the interface type and address to the determined register address (block 980). For example, data writer 460 may use the interface type and address associated with initialization table row 550 to output the initialization value stored in register value entry 560 to the register address identified in register address value entry 558 of the selected initialization row 550.

Processing may return to block 940 to determine as to whether there are any rows left to read. If additional rows remain (block 940—YES), blocks 950, 960, 970, and 980 may be repeated for each remaining row. If not additional rows remain (block 940—NO), the initialization process may be completed (block 990).

Figure 10:
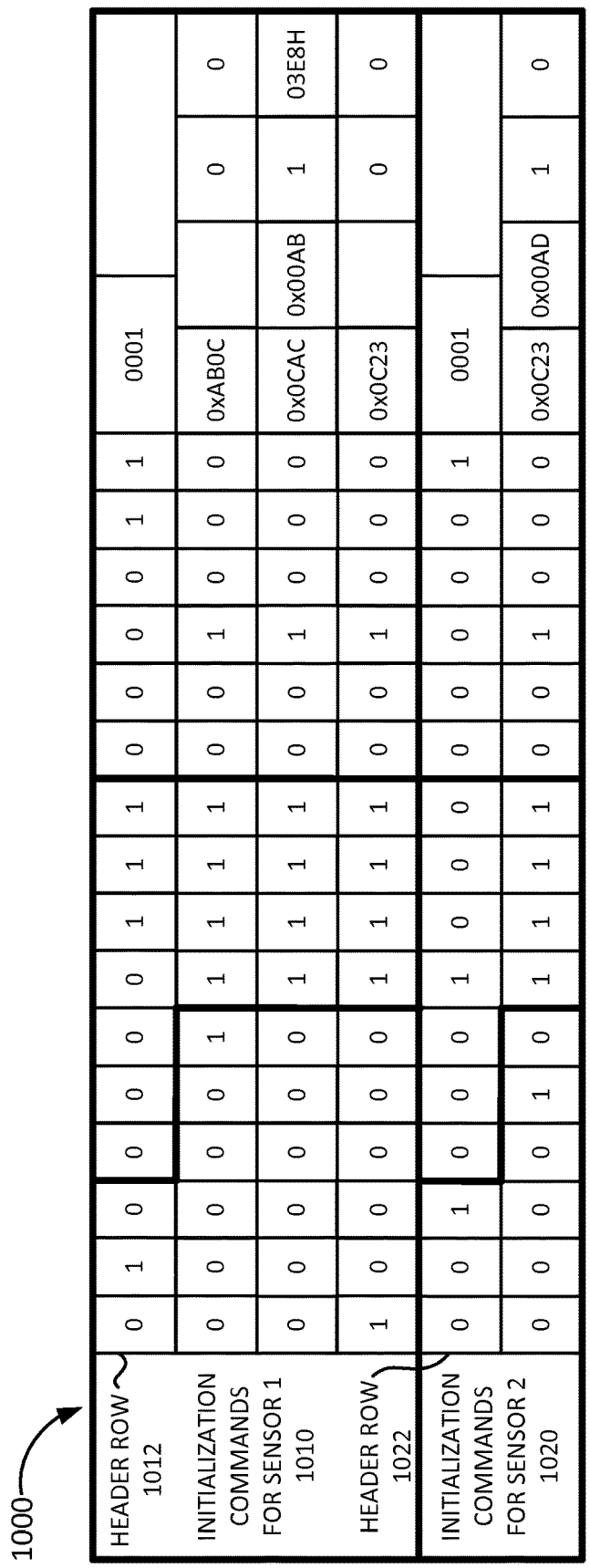
FIG. 10 is an exemplary initialization table according to an implementation described herein.

FIG. 10 is an exemplary initialization table 1000 according to an implementation described herein. Assume two sensor devices 120 are connected to modem device 110, with a first sensor device 120 connected via an SPI interface and a second sensor device 120 connected via an I2C interface. Further, assume that the first sensor device 120 requires initialization of three registers and that the second sensor device 120 requires initialization of one register.

As shown in FIG. 10, the first row of initialization table 1000 corresponds to an initialization header for the first sensor device 120. The 010 value in the header indicates an SPI interface, with an interface address of 0000111, and the 000011 value indicates three configuration rows. The first configuration row indicates that the register at register address 0xAB0C should be read immediately (i.e., the latency value is zero). The second configuration row indicates that the value 0xAB should be written to the register at register address 0x0CAC after 1000 milliseconds (ms). The third configuration row indicates that the register at register address 0x0C23 should be read immediately. The fifth row of initialization table 1000 corresponds to an initialization header for the second sensor device 120. The 001 value in the header indicates an I2C interface, with an interface address of 0001000, and the 000001 value indicates one configuration row. The single configuration row indicates that the value 0x00AD should be written to the register at register address 0x0C23 immediately.

Figure 11:
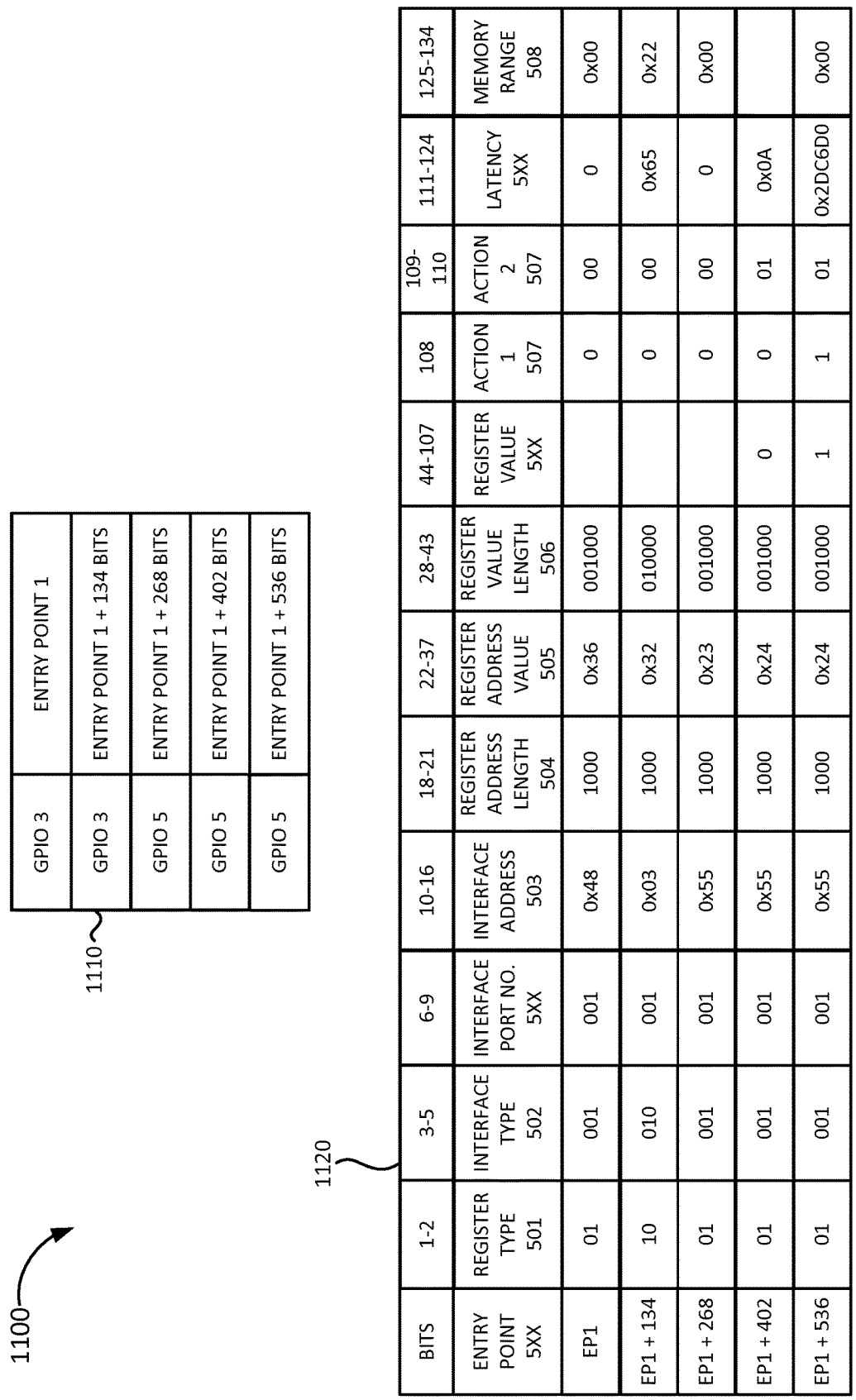
FIG. 11 is an exemplary configuration table according to an implementation described herein.

FIG. 11 is an exemplary configuration table 1100 according to an implementation described herein. Configuration table 1100 may include an interrupt table 1110 and configuration table 1120. Interrupt table 1110 may map GPIO ports to entry points of configuration table 1120 in term of bit offsets. Interrupt table 1110 shows that two GPIO ports are configured for sensor device 120: GPIO port 3 and GPIO port 5. If an interrupt is received at GPIO port 3, modem device 110 will read two registers.

If an interrupt is received at GPIO port 5, modem device 110 will read one register and write to two registers. Upon receiving an interrupt at GPIO port 5, modem device 110 will access the configuration row at entry point 1+160 bits, which is the third row of configuration table 1120. Modem device 110 will read sensor data from a sensor device 120 at interface 0x55 of an IC2 interface from a register at register address 0x23 and will send the read sensor data value to sensor management system 140. Modem device 110 will then wait 10 ms, disable the interrupt, and write the value 0 to the register at register address 0x24. Modem device 110 will then wait 300 ms, enable the interrupt, and write the value 1 to the register at register address 0x24.

As an example, while a series of blocks have been described with respect to FIGS. 6-9, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A wireless communication device comprising:
   at least one peripheral interface;
   a controller including:
   logic configured to:
   receive an indication of a sensor event from a sensor device via an interface port of the at least one peripheral interface;
   map a port number associated with the interface port to an entry point in a configuration table, wherein the entry point is defined in terms of a bit offset;
   perform a table lookup in the configuration table based on the entry point;
   identify a sensor data location in the sensor device based on the table lookup, wherein the sensor data location corresponds to an address of a register in the sensor device;
   determine whether the identified sensor data location corresponds to a status register, application register, or memory register;

read data at the identified sensor data location using a data reading process that is based on whether the identified sensor data location corresponds to the status register, application register, or memory register; and encapsulate the read data into a data unit; and a radio frequency unit configured to:

transmit the data unit over a wireless connection to a sensor management system.

2. The wireless communication device of claim 1, wherein the logic configured to receive an indication of a sensor event from a sensor device via an interface port is further configured to:

detect an interrupt received at the interface port.

3. The wireless communication device of claim 1, wherein the logic configured to perform a table lookup in the configuration table based on the entry point is further configured to:

determine that the sensor event is associated with a status register based on the port number;

determine an interface type, an interface address, and a status register address associated with the status register stored in a row of the configuration table associated with the port number; and retrieve a status value stored in the status register by accessing the status register in the sensor device using the determined interface type, interface address, and status register address.

4. The wireless communication device of claim 3, wherein the logic is further configured to:

select a set bit in the retrieved status value;

identify a row of the configuration table associated with the selected set bit;

determine another interface type, another interface address, and a memory register address associated with the identified row; and retrieve a memory register value stored in a memory register, associated with the determined memory register address, using the determined other interface type, other interface address, and memory register address.

5. The wireless communication device of claim 1, wherein the logic configured to perform a table lookup in the configuration table based on the entry point is further configured to:

determine that the sensor event is associated with an application register based on the port number;

determine an interface type, an interface address, and an application register address associated with the application register stored in a row of the configuration table associated with the port number; and retrieve an application register value stored in the application register by accessing the application register in the sensor device using the determined interface type, interface address, and application register address.

6. The wireless communication device of claim 1, wherein the logic configured to perform the configuration table based on the entry point is further configured to:

determine that the sensor event is associated with a memory register based on the port number; determine an interface type, an interface address, and a memory register address associated with the memory register stored in a row of the configuration table associated with the port number; and retrieve a memory register value stored in the memory register by accessing the memory register in the sensor device using the determined interface type, interface address, and application register address.

7. The wireless communication device of claim 1, wherein the logic is further configured to:

receive another data unit from the sensor management system over the wireless connection;

retrieve a register value, a register address, interface type, and interface value from the received other data unit; and output the retrieved register value to the retrieved register address in the sensor device using the retrieved interface type and interface value.

8. The wireless communication device of claim 1, wherein the logic is further configured to:

detect activation of the sensor device;

access an initialization table, in response to detecting the activation of the sensor device; and initialize one or more values in the sensor device based on the initialization table.

9. The wireless communication device of claim 8, wherein the logic to initialize the one or more values in the sensor device based on the initialization table is further configured to:

determine a number of initialization rows in the initialization table;

select a row in the initialization table;

determine an interface type, an interface address, a register address, and a register value stored in the selected row of the initialization table; and output the determined register value to the determined register address in the sensor device using the determined interface type and interface address.

10. A system comprising:

one or more sensor devices; and a wireless communication device configured to:

receive an indication of a sensor event from a sensor device, of the one or more sensor devices, via an interface port of a peripheral interface;

map a port number associated with the interface port to an entry point in a configuration table, wherein the entry point is defined in terms of a bit offset;

perform a table lookup in the configuration table based on the entry point;

identify a sensor data location in the sensor device based on the table lookup, wherein the sensor data location corresponds to an address of a register in the sensor device;

determine whether the identified sensor data location corresponds to a status register, application register, or memory register;

read data at the identified sensor data location using a data reading process that is based on whether the identified sensor data location corresponds to the status register, application register, or memory register encapsulate the read data into a data unit; and transmit the data unit over a wireless connection to a sensor management system.

11. The system of claim 10, wherein the wireless communication device and the one or more sensor devices are connected via at least one of:

a Serial Peripheral Interface (SPI) bus;

a Universal Asynchronous Receiver/Transmitter (UART) bus; or an Inter-Integrated Circuit (I2C) serial bus.

12. The system of claim 10, wherein the one or more sensor devices include a plurality of sensor devices, and wherein the system further comprises:

a microcontroller unit configured to function as an interface between the wireless communication device and the plurality of sensor devices.

13. The system of claim 10, further comprising:
a wireless access point device configured to:
receive first data from the one or more sensor devices via wireless signals and to provide the first data to the wireless communication device; and
receive second data from the wireless communication device and to provide the second data to the one or more sensor devices via wireless signals.

14. The system of claim 13, further comprising:
a microcontroller unit configured to function as an interface between the wireless communication device and the wireless access point device.

15. A method, performed by a wireless communication device, the method comprising:
receiving, by the wireless communication device, an indication of a sensor event from a sensor device via an interface port of a peripheral interface associated with the wireless communication device;
mapping, by the wireless communication device, a port number associated with the interface port to an entry point in a configuration table, wherein the entry point is defined in terms of a bit offset;
performing, by the wireless communication device, a table lookup in the configuration table based on the entry point;
identifying, by the wireless communication device, a sensor data location in the sensor device based on the table lookup, wherein the sensor data location corresponds to an address of a register in the sensor device;
determining, by the wireless communication device, whether the identified sensor data location corresponds to a status register, application register, or memory register;
reading, by the wireless communication device, data at the identified sensor data location using a data reading process that is based on whether the identified sensor data location corresponds to the status register, application register, or memory register
encapsulating, by the wireless communication device, the read data into a data unit; and
transmitting, by the wireless communication device, the data unit over a wireless connection to a sensor management system.

16. The method of claim 15, wherein performing a table lookup in the configuration table based on the interface port further includes:

determining that the sensor event is associated with a status register based on the port number;
determining an interface type, an interface address, and a status register address associated with the status register stored in a row of the configuration table associated with the port number; and
retrieving a status value stored in the status register by accessing the status register in the sensor device using the determined interface type, interface address, and status register address.

17. The method of claim 16, further comprising:
selecting a set bit in the retrieved status value;
identifying a row of the configuration table associated with the selected set bit;
determining another interface type, another interface address, and a memory register address associated with the identified row; and
retrieving a memory register value stored in a memory register, associated with the determined memory register address, using the determined other interface type, other interface address, and memory register address.

18. The method of claim 15, wherein performing the table lookup in the configuration table based on the entry point further includes:
determining that the sensor event is associated with a memory register based on the port number;
determining an interface type, an interface address, and a memory register address associated with the memory register stored in a row of the configuration table associated with the port number; and
retrieving a memory register value stored in the memory register by accessing the memory register in the sensor device using the determined interface type, interface address, and application register address.

19. The method of claim 15, further comprising:
detecting activation of the sensor device;
accessing an initialization table, in response to detecting the activation of the sensor device;
determining a number of initialization rows in the initialization table;
selecting a row in the initialization table;
determining an interface type, an interface address, a register address, and a register value stored in the selected row of the initialization table; and
outputting the determined register value to the determined register address in the sensor device using the determined interface type and interface address.

* * * * *